United States Patent [19]

Takei et al.

[11] Patent Number: 5,344,237
[45] Date of Patent: Sep. 6, 1994

[54] LINEAR MOTION ROLLING CONTACT GUIDE UNIT HAVING OPPOSITE ROLLER AND BALL CONTACTS

[75] Inventors: Seiji Takei, Yokohama; Azuyasu Kitayama, Kukizaki, both of Japan

[73] Assignee: Nippon Thompson Co., Ltd., Tokyo, Japan

[21] Appl. No.: 51,025

[22] Filed: Apr. 21, 1993

[30] Foreign Application Priority Data

Apr. 22, 1992 [JP] Japan .................. 4-129547

[51] Int. Cl.$^5$ .............................. F16C 29/06
[52] U.S. Cl. ........................... 384/45; 384/48
[58] Field of Search ............... 384/44, 45, 48, 43

[56] References Cited

U.S. PATENT DOCUMENTS

| | | | |
|---|---|---|---|
| 4,799,805 | 1/1989 | Tanaka | 384/45 X |
| 4,988,215 | 1/1991 | Osawa | 384/45 |
| 5,044,780 | 9/1991 | Teramachi | 384/44 |
| 5,137,371 | 8/1992 | Osawa | 384/45 |
| 5,228,783 | 7/1993 | Ueki | 384/44 |

FOREIGN PATENT DOCUMENTS 4206808 9/1992 Fed. Rep. of Germany ........ 384/44

Primary Examiner—Thomas R. Hannon
Attorney, Agent, or Firm—Skjerven, Morrill, MacPherson, Franklin & Friel

[57] ABSTRACT

A linear motion rolling contact guide unit includes a rail extending over a desired length, a slider slidably mounted on the rail and a plurality of rolling members interposed between the rail and the slider. The rail has a pair of first and second opposite side surfaces. A pair of oppositely inclined guide channels for rollers is provided between the first side surface of the rail and a corresponding opposite surface of the slider and another guide channel for balls is provided between the second side surface of the rail and a corresponding opposite surface of the slider.

8 Claims, 2 Drawing Sheets

LINEAR MOTION ROLLING CONTACT GUIDE UNIT HAVING OPPOSITE ROLLER AND BALL CONTACTS

BACKGROUND OF THE INVENTION

1. Field of the Invention

This invention generally relates to a linear motion rolling contact guide unit, and, in particular, to such a guide unit having a high rigidity and thus suitable for use in machine tools or the like.

2. Description of the Prior Art

A linear motion rolling contact guide unit is well known in the art, and it generally includes a rail extending straight over a desired length, a slider slidably mounted on the rail and a plurality of rolling members, such as balls or rollers, interposed between the rail and the slider. A typical prior art linear motion rolling contact guide unit is described in the Japanese Pat. Laid-open Pub. No. 2-279243, and the guide unit described in this prior publication is illustrated here in FIG. 3. As shown in FIG. 3, the prior art linear motion rolling contact guide unit includes a rail 21 extending straight over a desired length and having a pair of oppositely inclined inner guide surfaces at each side thereof. The guide unit also includes a slider 20 which is slidably mounted on the rail 21 and which is also formed with a pair of oppositely included outer guide surfaces, each located opposite to a corresponding one of the pair of oppositely inclined inner guide surfaces of the rail. Thus, there are defined four guide separate channels, each defined by a pair of oppositely located inner and outer guide surfaces, between the rail 21 and the slider 20. A plurality of rollers 22, 23, 24 and 25 are provided in each of these four guide channels so that a sliding contact is provided between the rail 21 and the slider 20.

In the guide unit shown in FIG. 3, since the rolling contact between the rail 21 and the slider 20 is provided only by the rollers 22–25, the sliding resistance is extremely small so that the slider 20 may move along the rail 21 slidingly extremely smoothly. However, with this structure, the sliding resistance is too small for use in machine tools or the like and the cutting resistance cannot be shared by this guide unit. As a result, if the guide unit shown in FIG. 3 were used in machine tools, a heavy duty cutting operation could not be carried out.

SUMMARY OF THE INVENTION

In accordance with the present invention, there is provided a linear motion rolling contact guide unit, comprising: a rail extending over a desired length, a slider slidably mounted on the rail; a pair of separate first and second guide channels formed between a first side surface of the rail and a corresponding opposite side surface of the slider; a plurality of rollers provided in each of the pair of first and second guide channels; a third guide channel formed between a second side surface of the rail opposite to the first side surface and a corresponding opposite side surface of the slider; and a plurality of balls provided in the third guide channel.

It is therefore a primary object of the present invention to provide an improved linear motion rolling guide unit.

Another object of the present invention is to provide an improved linear motion rolling contact guide unit suitable for use in machine tools or the like.

A further object of the present invention is to provide an improved linear motion rolling contact guide unit capable of providing a desired level of sliding resistance.

Other objects, advantages and novel features of the present invention will become apparent from the following detailed description of the invention when considered in conjunction with the accompanying drawings.

DESCRIPTION OF THE PREFERRED EMBODIMENTS

Figure 1:
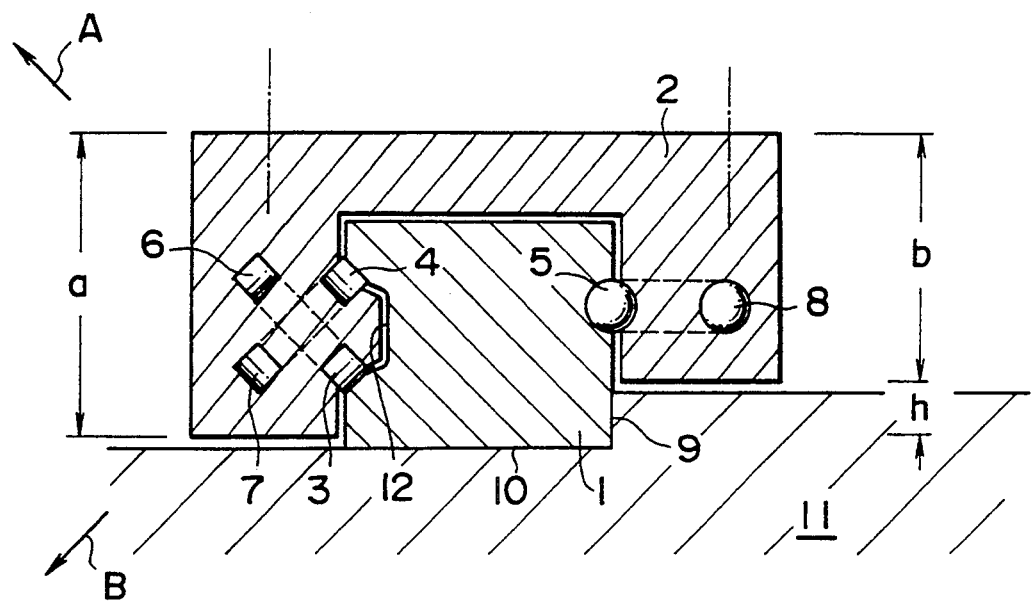
FIG. 1 is a schematic illustration showing in transverse cross section a linear motion rolling contact guide unit constructed in accordance with one embodiment of the present invention.

Referring now to FIG. 1, there is schematically shown in transverse cross section a linear motion rolling contact guide unit constructed in accordance with one embodiment of the present invention. As shown, the guide unit of this embodiment includes a rail 1 which extends over a desired length along its longitudinal axis and has a pair of left and right side surfaces. The present guide unit also includes a slider 2 which is slidably mounted on the rail 1.

The left side surface of rail 1 is formed with a recess 12 having a generally trapezoidal, cross sectional shape and extending in parallel with the longitudinal axis of the rail 1 to thereby define a pair of oppositely inclined upper and lower inner guide surfaces. In the illustrated embodiment, the upper inclined inner guide surface is oriented to face generally downward as indicated by arrow B, whereas the lower inclined inner guide surface is oriented to face generally upward as indicated by arrow A. Thus, the upper and lower inclined inner guide surfaces are inclined in opposite directions from each other with respect to a horizontal surface.

The slider 2 is generally U-shaped in cross section and thus it includes a top section and a pair of side sections which depend from the opposite sides of the top section to thereby define a generally U-shaped cross section. The left-hand side section of the slider 2 has a projection which is generally trapezoidal in cross section corresponding to the recess 12 of rail 1 and which projects into the space defined by recess 12 of the rail 1 with a predetermined gap therebetween. The slider 2 is formed with a pair of oppositely inclined upper and lower outer guide surfaces as located opposite to the upper and lower inner guide surfaces of rail 1, respectively. Thus, a pair of upper inner and outer guide surfaces define an upper guide channel, in which a plurality of rollers 4 are provided in rolling contact with the paired upper inner and outer guide surfaces, and a pair of lower inner and outer guide surfaces define a lower guide channel, in which a plurality of rollers 3 are provided in rolling contact with the paired lower inner and outer guide surfaces.

In the embodiment shown in FIG. 1, a pair of endless circulating paths is provided for the rollers 4 and 5. As well known in the art, an endless circulating path includes a load path section, a return path section and a pair of curved connecting path sections, connecting the corresponding ends of the load and return path sections. The load path section is typically defined by a pair of opposed guide surfaces between a rail and a slider and the return path section is provided in the slider extending in parallel with the load path section. The pair of curved connecting path sections are typically provided in the slider to connect the corresponding ends of the load and return path sections to thereby complete an endless circulating path. For example, in the present embodiment, the guide channel defined by the oppositely located upper inner and outer guide surfaces corresponds to a load path section, and a return path section 7 is provided in the slider 2 with a pair of curved connecting path sections as generally indicated by the dotted lines provided to connect the corresponding ends of the load and return path sections. Thus, the rollers 4 may rollingly move along this endless circulating path endlessly. Similarly, another endless circulating path is provided by a load path section corresponding to the guide channel defined by the oppositely located lower inner and outer guide surfaces, a return path section 6 and a pair of curved connecting path sections, each connecting the corresponding ends of the load and return path sections. As a result, the rollers 3 may also move rollingly along its endless circulating path endlessly.

Figure 4:
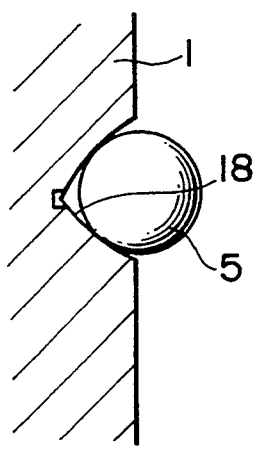
FIG. 4 is a schematic illustration showing on an enlarged scale a portion of the guide unit shown in FIG. 1 or 2.

The right side surface of rail 1 is formed with an inner guide groove 18 (see FIG. 4) which extends in parallel with the longitudinal axis of rail 1 and which is located at a level between the levels of the upper and lower inner guide surfaces of the rail 1. The guide groove 18 of rail 1 has a shape suitable for receiving partly therein balls 5. In the preferred embodiment, the inner guide groove 18 has a generally Gothic arch shape. The Gothic arch shaped inner guide groove 18 can provide an suitably increased level of sliding resistance which is desired when the present guide unit is applied to machining tools. Thus, in such applications, since part of the cutting resistance may be shared by the present guide unit, a heavy duty cutting operation can be carried out by a machining tool incorporating the present guide unit.

The slider 2 is also formed with an outer guide groove located opposite to the inner guide groove 18 of rail 1 and preferably having a Gothic arch cross sectional shape. Thus, a guide channel is defined by these oppositely located inner and outer guide grooves and a plurality of balls 5 are provided in this guide channel. In addition, in the illustrated embodiment, this guide channel corresponds to a load path section of an endless circulating path which also includes a return path section 8 and a pair of curved connecting path sections as generally indicated by the dotted lines. Thus, balls 5 may move endlessly along this endless circulating path while the slider 2 moves along the rail 1.

When applied to machine tools, typically, two of the present guide units are provided in parallel and symmetrically with respect to a center line therebetween, with their sliders 2 fixedly attached to a common sliding table (not shown). In this case, when a lateral load is applied to the sliding table, such a lateral load may be advantageously borne by the rollers 5. Thus, the rigidity of such an assembly including a pair of guide units according to the present embodiment is increased and comparable to a guide unit having balls on both sides of its rail. Accordingly, a machine tool incorporating the present guide unit in this manner can carry out a heavy duty cutting operation effectively.

As shown in FIG. 1, since the guide groove for the balls 5 is located at a level inbetween the upper and lower guide surfaces for rollers 4 and 3, the right-hand section having a height b may be made shorter than the left-hand section having a height a by an amount $h=a-b$. In this manner, since a bottom portion 9 of the right-hand side surface of rail 1 is exposed over height h, this exposed side surface portion 9 of rail 1 may be used as a reference surface in mounting the rail 1 on a base 11. That is, the rail 1 has a flat bottom surface 10 and the base 11 has a flat top mounting surface with an alignment step. Thus, the flat bottom surface 10 of rail 1 may be brought into contact with the flat top surface of base 11 and the exposed side surface portion 9 of rail 1 is brought into contact with the alignment step of base 11 to have the rail 11 located at its desired position. In this manner, since the bottom surface 10 and the exposed side surface portion 9 of rail 1 are used as reference surfaces in mounting the rail 1 on the base 11, the total height of the resulting structure may be made smaller by the amount, which is also advantageous.

Figure 2:
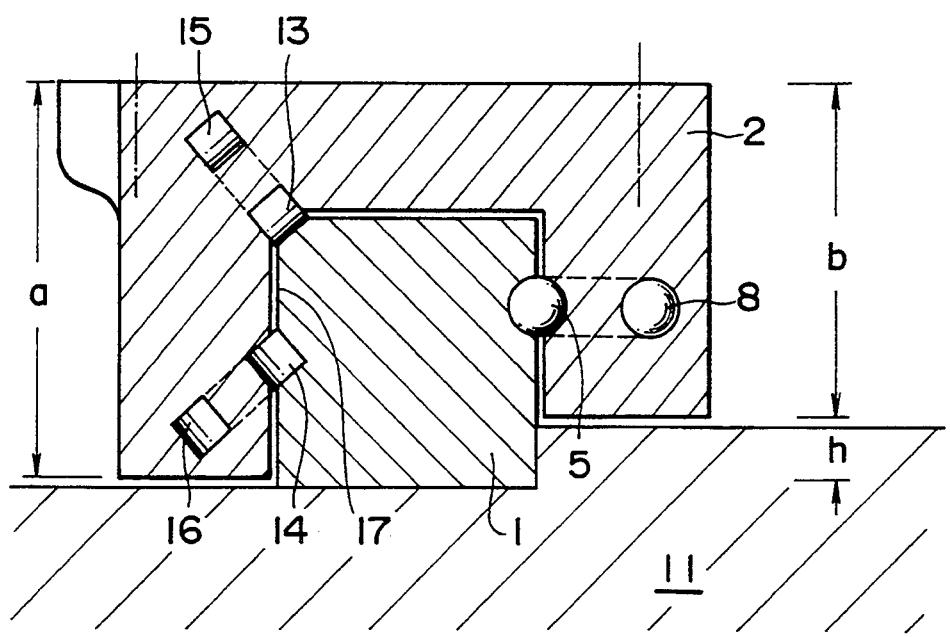
FIG. 2 is a schematic illustration showing in transverse cross section a linear motion rolling contact guide unit constructed in accordance with another embodiment of the present invention.
Figure 3:
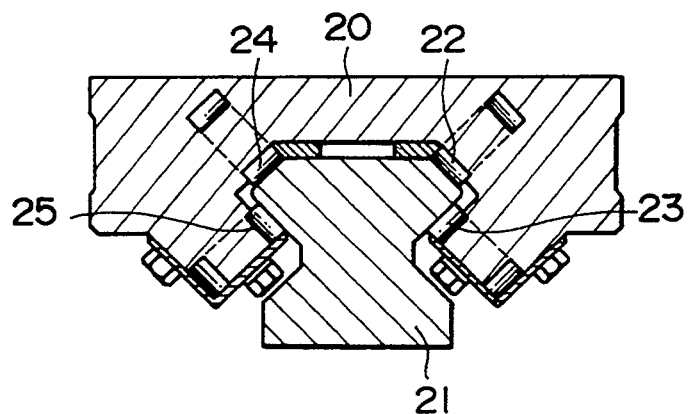
FIG. 3 is a schematic illustration showing in transverse cross section a typical prior art linear motion rolling contact guide unit described in the Japanese Pat. Laid-open Pub. No. 2-279243.

FIG. 2 illustrates another embodiment of the present invention, which is similar in many respects to the previous embodiment shown in FIG. 1 so that like numerals indicate like elements. The second embodiment shown in FIG. 2 differs from the first embodiment shown in FIG. 1 in the arrangement of the endless circulating guide grooves for rollers. That is, in the guide unit shown in FIG. 2, the rail 1 has a relatively flat left-hand side surface in which an upper inclined inner guide surface is formed at the top left shoulder portion thereof as oriented obliquely upwardly and a generally V-shaped groove is provided below the upper inclined inner guide surface to provide a lower inclined inner guide surface oriented obliquely downward.

The slider 2 has an upper inclined outer guide surface located opposite to and spaced apart from the corresponding upper inclined inner guide surface to thereby define an upper guide channel which corresponds to a load path section of an endless circulating path. That is, the slider 2 also includes a return path section 15 which extends in parallel with and which are connected to the load path section through a pair of curved connecting path sections indicated by the dotted lines. A plurality of rollers 13 are provided in this endless circulating path so that the rollers 13 provide a rolling contact between the rail 1 and the slider 2. The slider 2 is also provided with a lower inclined outer guide surface located opposite to and spaced apart from the corresponding lower inclined inner guide surface to thereby define a lower guide channel which corresponds to a load path section of another endless circulating path. The slider 2 includes a return path section 16 which extends in parallel with and which are connected to the load path section through a pair of curved connecting path sections indicated by the dotted lines. A plurality of rollers 14 are provided in this second endless circulating path so that the rollers 14 also provide a rolling contact between the rail 1 and the slider 2.

As differently from the first embodiment shown in FIG. 1, in the present embodiment shown in FIG. 2, the first and second endless circulating paths are not provided in a crossed arrangement when viewed in a direction in parallel with the longitudinal axis of the rail 1, but the first and second endless circulating paths are provided in a non-crossed arrangement. The remaining structure of the second embodiment shown in FIG. 2 is similar to that of the first embodiment shown in FIG. 1.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A linear motion rolling contact guide units, comprising:
   a rail extending over a desired length;
   a slider slidably mounted on said rail with only two rolling contacts at one side of the rail and with only one rolling contact at an opposite side of the rail;
   a pair of separate first and second guide channels formed at a first height and a second height, respectively, between a first side surface of said rail and a corresponding opposite side surface of said slider, said first height being different in vertical level from said second height;
   said only two rolling contracts being provided by a plurality of rollers provided in each of said pair of first and second guide channels;
   a third guide channel formed at a third height inbetween said first and second heights between a second side surface of said rail opposite to said first side surface of said rail and a corresponding opposite side surface of said slider; and
   said only rolling contact being provided by a plurality of balls provided in said third guide channel.

2. The guide unit of claim 1, wherein said third guide channel has a Gothic arch cross sectional shape at least a part thereof.

3. The guide unit of claim 1, wherein first, second and third endless circulating paths, each including a load path section, a return path section and a pair of curved connecting path sections, each connecting the corresponding ends of the load and return path sections, are provided, with the load path section of the first endless circulating path corresponding to said first guide channel, the load path section of the second endless circulating path corresponding to said second guide channel and the load path section of the third endless circulating path corresponding to said third guide channel.

4. The guide unit of claim 3, wherein said first and second endless circulating paths are provided in a crossed arrangement when viewed in a direction parallel to the longitudinal axis of said guide unit.

5. The guide unit of claim 3, wherein said first and second endless circulating paths are provided in a non-crossed arrangement when viewed in a direction parallel to the longitudinal axis of said guide unit.

6. The guide unit of claim 1, wherein said slider includes a horizontal section and a pair of first and second vertical sections which depend from the opposite sides of said horizontal section, whereby said first vertical section is located opposite to said first side surface of said rail and said second vertical section is located opposite to said second side surface of said rail, said second vertical section being shorter than said first vertical section to thereby form an exposed portion of said second side surface of said rail for use as a reference surface in mounting the rail to a base.

7. The guide unit of claim 6, wherein said rail has a bottom surface, which, together with said exposed portion of said second side surface of said rail, are used as reference surfaces for having said rail mounted on a base.

8. The guide unit of claim 7, wherein said base has a top mounting surface and a step against which said exposed portion of said second side surface of said rail is brought into abutment when said rail is mounted on said base.

* * * * *